117,134

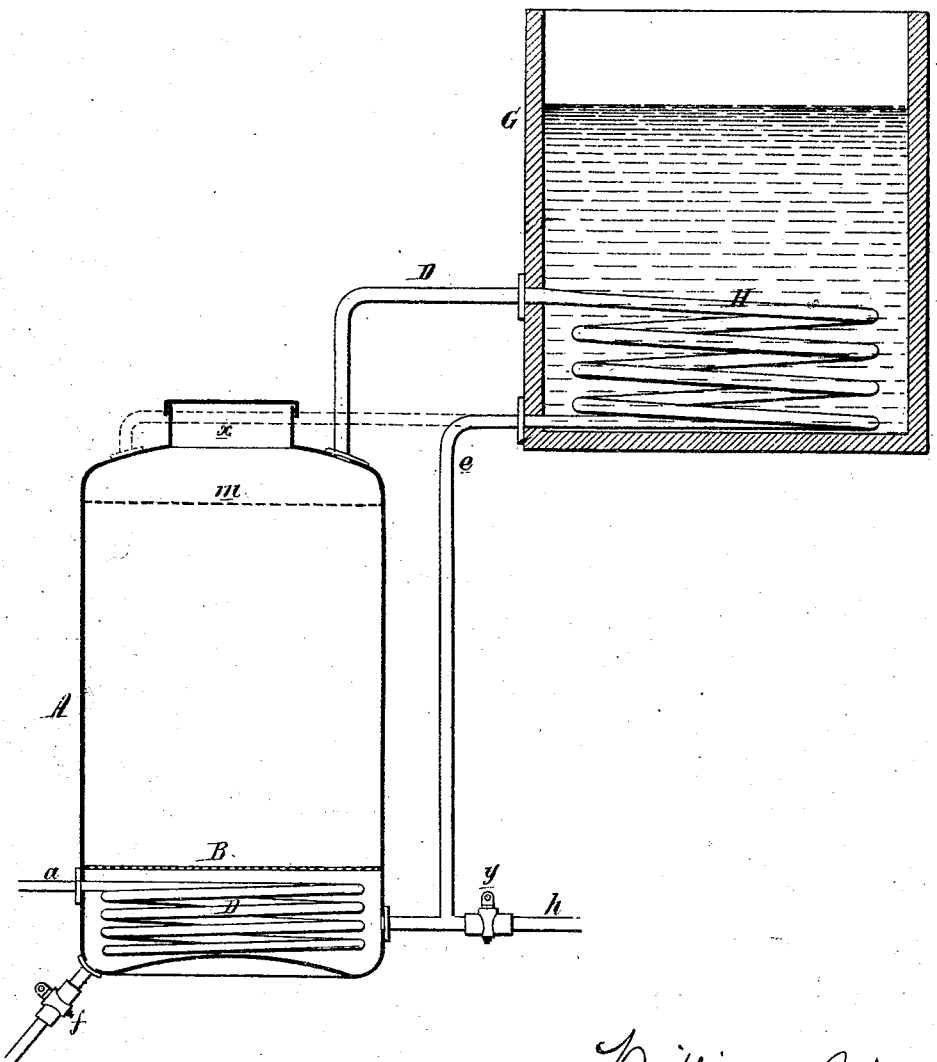

UNITED STATES PATENT OFFICE.

WILLIAM ADAMSON, OF PHILADELPHIA, PENNSYLVANIA.

IMPROVEMENT IN THE MANUFACTURE OF PAPER-STOCK.

Specification forming part of Letters Patent No. 117,134, dated July 18, 1871.

*To all whom it may concern:*

Be it known that I, WILLIAM ADAMSON, of Philadelphia, county of Philadelphia, State of Pennsylvania, have invented an Improved Paper-Stock, of which the following is a specification:

My invention consists of paper-stock made from wood or other fiber-bearing vegetable substance by subjecting the same to the action of hydrocarbons—by preference naphtha, benzine, gasoline, or other equivalent volatile product of distillation—the paper-stock thus produced being of superior quality.

In manufacturing my improved paper-stock I have used apparatus illustrated in the drawing, but it should be understood in the outset that I do not restrict myself to that or any other apparatus, for many different appliances and modes of operation may be used in the manufacture.

In the drawing, A represents a closed vessel, of iron or any other material which will resist the chemical action of the contents. Within this vessel, and extending across the same a short distance from the bottom, is a perforated diaphragm, B, on which is placed the wood-shavings, or other fiber-bearing vegetable matter which admits of being converted into paper-stock. In the space between the diaphragm and the bottom of the vessel I place a coil, D, or its equivalent, to which steam is introduced through a pipe, $a$, and to the lower corner of the vessel I attach a discharge-pipe and faucet, $f$. A pipe, D, extends from the top of the vessel into a condenser, G, where it assumes the form of a coil or worm, X, the latter terminating in a pipe, $e$, which communicates with the space between the perforated diaphragm B and the bottom of the vessel. The vessel should have a man-hole, $x$, for the introduction of the material, the whole being furnished with a suitable detachable cover. The vessel may also be furnished with a suitable safety-valve. We will suppose that, in the present instance, ordinary wood-shavings are confined in the vessel between the top of the same and the perforated diaphragm B, and that a supply of benzine, benzole, gasoline, or other equivalent product of the distillation of petroleum or coal, has been introduced through a pipe, $h$, into the space below the diaphragm, the supply, after reaching or nearly reaching the diaphragm, being cut off by closing the cock $y$. On introducing steam into the coil, vapor will rise from the benzine or its equivalent, and, after permeating the mass of shavings, will pass through the pipe D into the coil H, and, after being there condensed, will pass through the pipe $e$ to the vessel below the diaphragm, to be there again converted into vapor by the steam-coil, the vapor pursuing its previous course through the shavings prior to to being again condensed. The vapor as it thus permeates and circulates through the mass of shavings at once attacks the resinous and gummy ingredients of the wood, and these substances, being dissolved flow freely through the perforated diaphragm and lodge on the bottom of the vessel from which they may be withdrawn from time to time through the discharge-cock $f$. In a comparatively short time after the commencement of the operation but little remains on the perforated diaphragm excepting fibers which are uninjured by the treatment and are available as superior paper-stock.

I have succeeded in obtaining the desired fibers from shavings of pine wood by the application of benzine under a pressure of from five to ten pounds per square inch. Vapors of different degrees of heat, however, may be required for different kinds of wood. The heat of the vapor may be varied by passing steam of different pressures and temperatures through the coil, or by using duplicate coils, or in any of the many other modes which can be adopted for accomplishing this end.

I have shown in the drawing and have described above what I consider economical appliances for carrying my invention into effect, but it should be understood that the process can be carried out in an open vessel on many woods. The objection to this, however, is the loss of benzine or its equivalent. The woody matter may even be subjected to the direct action of benzine or its equivalent in open or closed vessels, but I prefer the application of vapor, as described.

The process may be carried into effect by the combined direct application of benzine or its equivalent and the vapors of the same. For instance, there may be a second perforated diaphragm, as shown by the dotted lines $m$, near the top of the vessel, the shavings or other fiber-bearing woody matter being confined between the two diaphragms, and the condensed benzine or its equivalent may be permitted to pass directly from the coil in the condenser onto the upper diaphragm, through which it will pass in streams and percolate through the mass of shavings until it is vaporized by the steam-coil or other heat-generator, and the vapor again ascends to be condensed as before. In this case there will be always the direct application of benzine to the material by descending currents and simultaneously with the application of ascending vapor.

Other apparatus and appliances for carrying out my invention, either by the direct application of benzine or other equivalent product of distillation of petroleum or coal, or by the application of vapors of benzine or its equivalent, or by both, will readily suggest themselves to those who are familiar with the chemical processes and apparatus. The distinguishing feature of the stock is the integrity of the fibers, which are uninjured by the treatment to which the material is subjected. The fiber may be converted into pulp by any of the mechanical or chemical processes now in use.

I claim—

A new article of manufacture and commerce, consisting of paper-stock, made from wood or other ligneous substance by subjecting the same to the action of hydrocarbons.

In testimony whereof I have signed my name to this specification in the presence of two subscribing witnesses.

WILLIAM ADAMSON.

Witnesses:
   CHS. F. A. SIMONIN,
   H. HOWSON.